US009590252B2

(12) United States Patent
Ramaswamy et al.

(10) Patent No.: US 9,590,252 B2
(45) Date of Patent: Mar. 7, 2017

(54) LITHIUM SULFUR BATTERY HAVING CATHODE WITH NUCLEATION AGENTS

(71) Applicant: Nissan North America, Inc., Franklin, TN (US)

(72) Inventors: Nagappan Ramaswamy, Farmington Hills, MI (US); Peter Aurora, Ann Arbor, MI (US); Taehee Han, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 27 days.

(21) Appl. No.: 14/180,405

(22) Filed: Feb. 14, 2014

(65) Prior Publication Data
US 2015/0236350 A1    Aug. 20, 2015

(51) Int. Cl.
| | |
|---|---|
| *H01M 4/136* | (2010.01) |
| *H01M 4/62* | (2006.01) |
| *H01M 4/04* | (2006.01) |
| *H01M 4/38* | (2006.01) |
| *H01M 10/052* | (2010.01) |
| *H01M 4/58* | (2010.01) |
| *H01M 4/02* | (2006.01) |

(52) U.S. Cl.
CPC ......... *H01M 4/626* (2013.01); *H01M 4/0416* (2013.01); *H01M 4/38* (2013.01); *H01M 4/625* (2013.01); *H01M 10/052* (2013.01); *H01M 4/5815* (2013.01); *H01M 2004/021* (2013.01); *H01M 2004/028* (2013.01)

(58) Field of Classification Search
CPC ................................ H01M 4/362; H01M 4/96
See application file for complete search history.

(56) References Cited

U.S. PATENT DOCUMENTS

| | | | |
|---|---|---|---|
| 7,524,354 B2 | 4/2009 | Zhong et al. | |
| 8,450,236 B2 | 5/2013 | Fu et al. | |
| 2008/0254362 A1* | 10/2008 | Raffaelle | B82Y 30/00 429/188 |
| 2011/0223480 A1* | 9/2011 | Wee et al. | 429/218.1 |

OTHER PUBLICATIONS

Fu et al. (ACS Appl. Mater. Interfaces 2012, 4, 6046-6052).*
Chung et al. (Angew. Chem. Int. Ed. 2011, 50, 11409-11412).*

* cited by examiner

*Primary Examiner* — Stewart Fraser
*Assistant Examiner* — Olatunji Godo
(74) *Attorney, Agent, or Firm* — Young Basile Hanlon & MacFarlane, P.C.

(57) ABSTRACT

A cathode for a lithium-sulfur battery cell includes positive active material comprising sulfur and carbon coated onto an electrode substrate and gold nanoparticles affixed to the positive active material and configured to direct growth and deposition of lithium sulfide. A lithium ion battery cell, battery stack and method of making the cathodes are also provided.

6 Claims, 2 Drawing Sheets

LITHIUM SULFUR BATTERY HAVING CATHODE WITH NUCLEATION AGENTS

TECHNICAL FIELD

This disclosure relates to a cathode of a lithium sulfur battery having nucleation agents to deter agglomeration and deposition of lithium sulfide, and to methods of making the cathode.

BACKGROUND

The lithium-sulfur battery (Li—S battery) is a rechargeable battery, notable for its high energy density. Li—S batteries may be a successful alternative to lithium-ion cells because of their higher energy density and reduced cost from the use of sulfur. However, Li—S batteries do present some challenges that must be addressed before the advantages of Li—S batteries can be fully appreciated. For example, during discharge, a film-like insulating layer of lithium sulfide can form on the cathode. During subsequent charging, this insulating layer leads to high ohmic resistance and voltage losses.

SUMMARY

Cathodes for lithium-sulfur battery cells are disclosed. One embodiment of a cathode for a lithium-sulfur battery cell comprises a composite positive electrode material comprising sulfur, i.e., the active material, and carbon along with a polymeric binder, which is coated onto an electrode substrate. Gold nanoparticles are affixed to the composite electrode material and configured to direct growth and deposition of lithium sulfide. A lithium-sulfur battery cell and a battery stack comprising the cathodes herein are also disclosed.

A method of preparing a cathode for a lithium-sulfur battery cell is also disclosed comprising mixing dry components together, the dry components comprising sulfur, a conductive material, polymeric binder and a nucleation agent comprised of gold nano/micro particles, forming a slurry by adding a suitable organic solvent to the mixed dry components and further mixing to obtain a predetermined viscosity, applying the slurry to a substrate and drying and pressing to obtain a predetermined electrode thickness and porosity.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Figure 1:
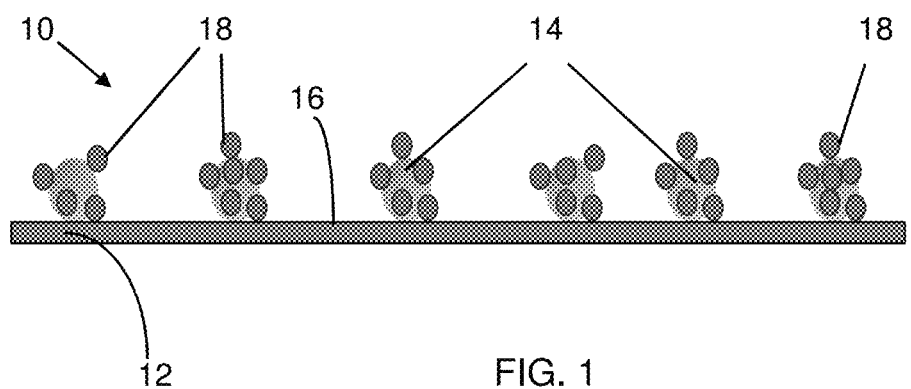
FIG. 1 is a schematic of a cathode for a Li—S battery cell as disclosed herein.

Unlike in a lithium ion battery, lithium is not intercalated inside another substance in the Li—S battery; rather, lithium metal is the negative electrode. Sulfur is used as the positive electrode active material. Because sulfur is well known as an insulator, the sulfur is typically combined with a material having good conductivity, such as carbon. A carbon coating can provide the missing electronic conductivity. Carbon nanofibers can provide an effective electron conduction path and structural integrity.

Chemical processes in the Li—S cell include lithium dissolution from the anode surface (and incorporation into alkali metal polysulfide salts) during discharge, and reverse lithium plating to the anode while charging. Because the lithium ions are not intercalated in the anode and cathodes as in the conventional lithium ion cell, the Li—S cell allows for a much higher lithium storage density. The lithium, during discharge, is transported across the electrolyte from the anode to the cathode and reacts with sulfur to undergo the following reaction, with a reverse reaction occurring when the cell is charged:

$$S_8 \rightarrow Li_2S_6 \rightarrow Li_2S_4 \rightarrow Li_2S_3 \rightarrow Li_2S_2 \rightarrow Li_2S$$

During discharge, lithium undergoes oxidation on the anode and subsequently reacts with the sulfur on the cathode to form lithium sulfide, $Li_2S$. Lithium sulfide is an electrically insulating and chemically insoluble species. Complete discharge of the battery can lead to the formation of large agglomerated particles of lithium sulfide or a film-like insulating layer of lithium sulfide on the cathode. During a subsequent charge process, the high electronic resistivity of the lithium sulfide and elemental sulfur leads to high ohmic resistance and voltage losses, resulting in poor coulombic efficiency, defined as follows:

$$\eta_c = \frac{Q_{out}}{Q_{in}}$$

where $\eta_c$ is the coulombic efficiency, $Q_{out}$ is the amount of charge that exits the battery during the discharge cycle and $Q_{in}$ is the amount of charge that enters the battery during the charging cycle.

There is no control over the deposition morphology or particle size during the discharging and charging processes. As the insulating film continues to accumulate irreversibly over the cycling process, less lithium and sulfur are available as active species, leading to exponentially decreasing capacity.

The device and methods herein address these deficiencies in the Li—S battery by controlling particle size, growth dynamics, morphology and distribution of the lithium sulfide and elemental sulfur, thereby improving the Li—S battery's coulombic efficiency, improving the battery's charge efficiency, enhancing the battery's rate capability, decreasing charge cycle duration and reclaiming active sulfur particles.

In the method disclosed herein, nucleating agents are incorporated into the sulfur cathode of each cell of the Li—S battery to direct the growth of the lithium sulfide and elemental sulfur deposition. The nucleation agents disperse the deposits more evenly on the cathode structure, control the particle size of the deposited particles, and prevent agglomeration of the lithium sulfide and sulfur deposits.

Figure 2:
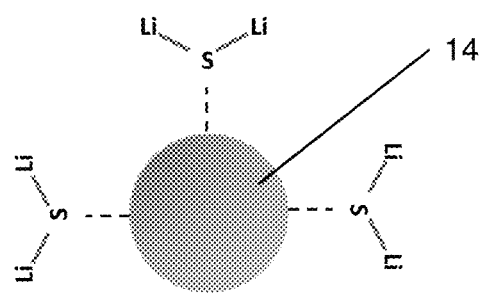
FIG. 2 is a schematic of the attraction between a gold nucleation particle and lithium sulfide particles.

A cathode 10 for a Li—S battery as disclosed herein is illustrated in FIG. 1 and comprises a composite electrode material 12 comprising sulfur or a sulfur-containing compound and conductive material, along with a polymeric binder. The conductive material can be carbon or a carbon-based material, as non-limiting examples. The cathode 10 further comprises a nucleation agent of gold 14. Gold 14 will react with elemental sulfur to form a covalent bond, as illustrated in FIG. 2. The gold nanoparticles or microparticles 14 are uniformly affixed across the surface area 16 of the cathode 10 and direct the growth of lithium sulfide 18 and sulfur deposition. The gold nanoparticles 14 attract lithium sulfide 18, sulfur and other sulfur-containing compounds, which will bind to the gold. The gold 14 results in more uniform cathode deposition of lithium sulfide 18 during discharge and sulfur particles during charging, controlled particle size of the lithium sulfide and sulfur depositions and reduced agglomeration of the lithium sulfide and sulfur deposits. These results, in turn, allow for easier dissolution of the lithium sulfide and sulfur particles during the charging process, resulting in improved battery charge efficiency, enhanced battery rate capability, decreased charge cycle duration and reclamation of active sulfur particles.

The amount of gold nanoparticles used for nucleation is determined based on energy density and cost. The amount of gold nanoparticles should be low enough to have no noticeable negative effect on energy density, and the cost of the gold nanoparticles can be offset by the increase in performance of the battery. The amount of gold nanoparticles is less than about four weight percent of the positive active material, and more particularly between two to three weight percent of the positive active material.

The gold nanoparticles can be less than one hundred nanometers in diameter, and more particularly, can be between twenty and fifty nanometers in diameter.

Figure 3:
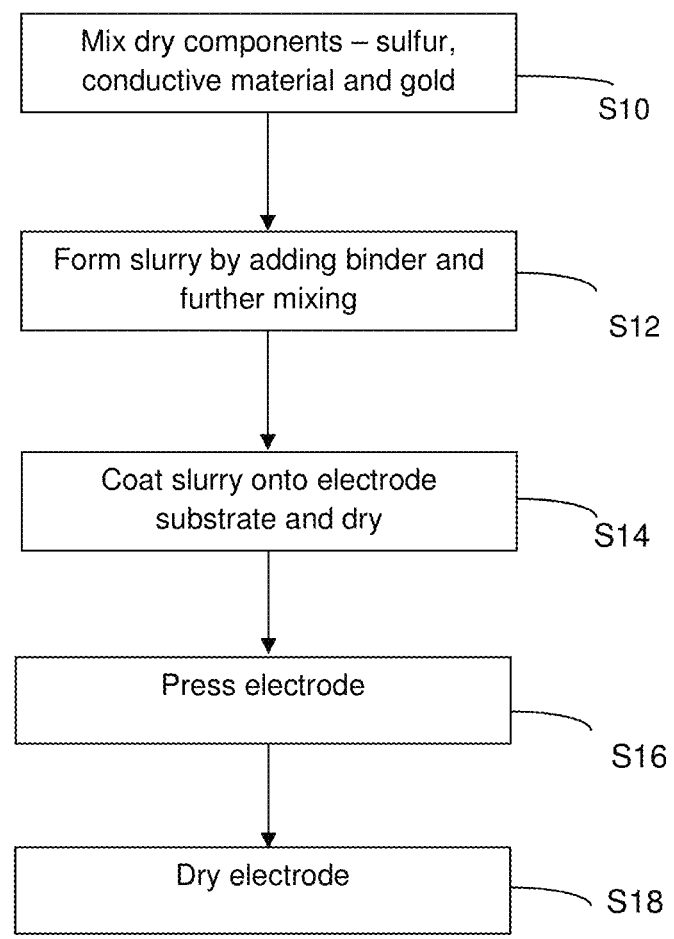
FIG. 3 is a flow diagram of a method of preparing a cathode as disclosed herein.

A method of fabricating a cathode for a Li—S battery is also disclosed herein. FIG. 3 is a flow diagram of such a method. In step S10, dry materials, including a sulfur containing compound, conductive material, a polymeric binder and a nucleation agent, are premixed. In step S12, a suitable organic solvent is added to the solid mixture and further mixed until a slurry of the desirable consistency and viscosity is obtained. Using a film applicator such as a doctor blade or roller, the slurry is coated on an electrode substrate in step S14 until a target active material loading is achieved and dried to remove any solvent remaining in the slurry. Drying can occur at about 80° C., as a non-limiting example. The cathodes are pressed to reach the desirable electrode thickness and porosity in step S16 and finally dried to remove moisture in step S18.

It should be noted that the nucleating agent cannot be added to the electrolyte in the lithium sulfur battery as an alternative to incorporating the agent into the cathode structure. The nucleating agent will not dissolve in the electrolyte and will precipitate and settle in the battery cell and/or collect on the separator film separating the anode and the cathode of the battery cell, blocking ion transport.

As described herein, the processes include a series of steps. Unless otherwise indicated, the steps described may be processed in different orders, including in parallel. Moreover, steps other than those described may be included in certain implementations, or described steps may be omitted or combined, and not depart from the teachings herein.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cathode for a lithium-sulfur battery cell comprising:
   a composite electrode material comprising elemental sulfur mixed with carbon coated onto an electrode substrate, with a nucleation agent of gold nanoparticles affixed uniformly across a surface of the composite electrode material,
   wherein the gold nanoparticles are available to bond with the elemental sulfur and lithium sulfide during use, the gold nanoparticles directing growth, morphology and deposition of lithium sulfide during charge and discharge of the lithium-sulfur battery, the gold nanoparticles having a diameter in a range of greater than twenty nanometers and less than one hundred nanometers, and the gold nanoparticles being less than four weight percent of the positive active material.

2. The cathode of claim 1, wherein the gold nanoparticles have a diameter in the range of greater than twenty nanometers and equal to or less than fifty nanometers.

3. A lithium-sulfur battery comprising the cathode of claim 1 and a lithium-containing anode.

4. A method of preparing a cathode for a lithium-sulfur battery cell comprising:
   mixing dry components together, the dry components comprising elemental sulfur and a conductive material;
   forming a slurry by adding a binder to the mixed dry components and further mixing to obtain a predetermined viscosity;
   applying the slurry to a substrate;
   uniformly affixing particles of gold as a nucleation agent along a surface of the slurry and drying; and
   pressing to obtain a composite electrode material of a predetermined thickness porosity, wherein gold nanoparticles exist on the composite electrode material to bond with the elemental sulfur and lithium sulfide during use, wherein the gold nanoparticles direct growth, morphology and deposition of lithium sulfide during charge and discharge of the lithium-sulfur battery, the gold nanoparticles having a diameter in a range of greater than twenty nanometers and less than one hundred nanometers, and the gold being less than four weight percent of the slurry.

5. The method of claim 4, wherein the gold has a diameter in the range of between greater than twenty nanometers and equal to or less than fifty nanometers.

6. The method of claim 4, wherein the conductive material is carbon.

* * * * *